US009120382B2

(12) United States Patent
Gibeau

(10) Patent No.: US 9,120,382 B2
(45) Date of Patent: Sep. 1, 2015

(54) TRACTION BATTERY DISCHARGE CONTROL

(75) Inventor: John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 371 days.

(21) Appl. No.: 13/595,124

(22) Filed: Aug. 27, 2012

(65) Prior Publication Data

US 2014/0055092 A1    Feb. 27, 2014

(51) Int. Cl.
*H02J 7/00* (2006.01)
*B60L 3/00* (2006.01)
*B60L 3/04* (2006.01)
*B60L 11/18* (2006.01)

(52) U.S. Cl.
CPC .............. *B60L 3/0046* (2013.01); *B60L 3/04* (2013.01); *B60L 11/18* (2013.01); *B60L 11/1861* (2013.01); *B60L 11/1866* (2013.01); *H02J 7/00* (2013.01); *Y02T 10/7005* (2013.01); *Y02T 10/7044* (2013.01); *Y02T 10/7061* (2013.01)

(58) Field of Classification Search
CPC ......... H02J 7/0029; H02J 7/00; H01M 10/44; Y02T 10/7077; Y02T 10/7044; Y02T 10/7005; Y02T 10/7061; B60L 3/04; B60L 3/0069; B60L 11/1861; B60L 3/0046; B60L 11/18; B60L 11/1866; G01R 31/025
USPC ......... 320/112, 118, 119, 124, 127, 128, 134, 320/135, 136
See application file for complete search history.

(56) References Cited

U.S. PATENT DOCUMENTS

| | | | |
|---|---|---|---|
| 2009/0243540 A1 | 10/2009 | Choi et al. | |
| 2010/0207635 A1* | 8/2010 | Plagens et al. | 324/509 |
| 2011/0133690 A1 | 6/2011 | Crane | |
| 2011/0254502 A1 | 10/2011 | Yount et al. | |
| 2012/0126751 A1* | 5/2012 | Cassidy | 320/118 |
| 2013/0187616 A1* | 7/2013 | Chuang et al. | 320/136 |

* cited by examiner

*Primary Examiner* — Vuthe Siek
(74) *Attorney, Agent, or Firm* — David B. Kelley; Brooks Kushman P.C.

(57) ABSTRACT

A vehicle includes a traction battery to propel the vehicle. The traction battery includes a plurality of cells that are each selectively connected to a resistor. A controller or controllers are provided that are configured to control the charging and discharging of the cells. The controller or controllers command the battery or a selected group of cells of the battery to discharge in response to a fault or triggering condition. The discharge enables the battery or the group of cells to achieve a state of charge of approximately zero or less.

19 Claims, 3 Drawing Sheets

TRACTION BATTERY DISCHARGE CONTROL

TECHNICAL FIELD

The present disclosure relates to the discharge of traction batteries.

BACKGROUND

A hybrid electric vehicle (HEV) can be propelled by an engine and a traction battery. A plug-in hybrid electric vehicle (PHEV) includes a traction battery that can be charged by electrically connecting it to an external power source. A battery electric vehicle (BEV) does not include an engine and is propelled only by a traction battery. HEV's, PHEV's and BEV's are three examples of vehicles that are at least partially propelled by a fraction battery. In such applications, the traction battery can include a battery pack having individual cells that are charged and discharged during operation.

SUMMARY

According to one embodiment of this disclosure, a vehicle includes a battery pack and an electric machine. The battery pack includes a plurality of battery cells. The electric machine is configured to transform electrical power from the battery pack into motive power to propel the vehicle. One or more controllers are configured to cause a discharge of the cells in response to detecting a fault condition. The discharge of the cells enables the battery pack to achieve a state of charge of approximately zero or less.

According to another embodiment of this disclosure, a method for controlling a vehicle includes discharging a plurality of cells of a traction battery in response to a fault condition, such that the cells achieve a state of charge of approximately zero or less.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
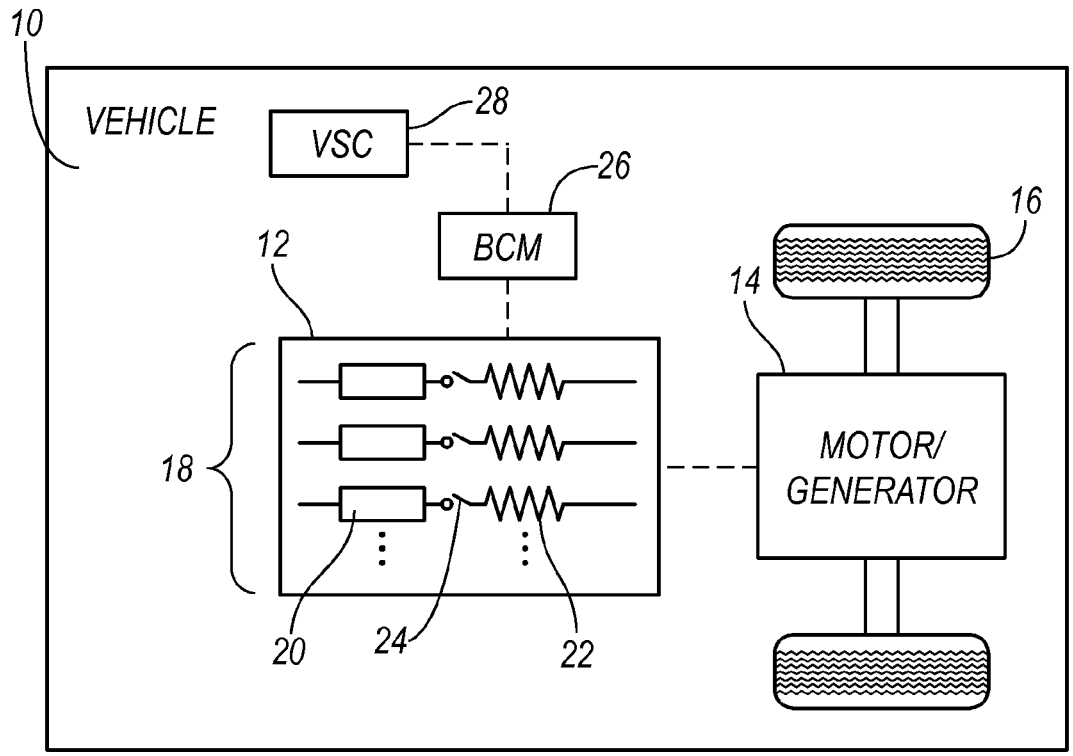
FIG. 1 is a schematic illustration of a vehicle having a traction battery and an associated control module.

Referring to FIG. 1, a vehicle 10 is provided. The vehicle can be an HEV, a PHEV, a BEV, or any other vehicle that is at least partially propelled by a traction battery system 12. The battery system 12 is electrically connected to an electric machine or motor/generator (M/G) 14. The M/G 14 can operate as a generator by receiving torque from an engine (not shown) or torque from wheels 16 through regenerative braking, for example. Alternatively, the M/G 14 can operate as a motor. That is, the M/G 14 can transform stored power from the battery system 12 to mechanical power to move the wheels 16.

The battery system 12 includes a battery pack 18 having a plurality of individual battery cells 20. Each of the battery cells 20 can be individually charged or discharged, as will be discussed further. Each battery cell 20 is connected to a respective resistor 22 in series via a switch 24. In other examples, the cells 20 can be connected in parallel to one or more resistors 22. Other arrangements are also possible. The switches 24 can be selectively opened or closed to complete the electrical connection between the cells 20 and their respective resistors 22. It should be understood that the switch 24 can be a contactor or mechanical switch, or the switch 24 can be a solid-state electrical switch such as a transistor.

The vehicle 10 further includes a battery control module (BCM) 26 that controls the battery system 12 and a vehicle system controller (VSC) 28 that controls the BCM 26 as well as other controllers (not shown) within the vehicle 10. References to the BCM 26 or to a "controller" thus can refer to one or more controllers in the vehicle 10 that can actively control the battery system 12. The BCM 26 can command the battery system 12 to receive current from the M/G 14 or a power source external to the vehicle 10, to provide current to the M/G 14, or to discharge current via the resistors 22. The BCM 26 can also monitor and regulate the charge of individual cells 20.

The BCM 26 can maintain a balance or relative equilibrium in the state of charge ("SOC") among the cells 20. Cell balancing can be accomplished, for example, by transferring energy from one cell 20 to another, or by dissipating energy in the cells 20 such that they all achieve a common voltage before subsequently charging them. During cell balancing or normal discharge of the cells 20, a minimum SOC in the cells 20 can be reached. At their minimum SOC, the cells 20 are at approximately their minimum allowable charge as dictated by the BCM 26 in which the BCM 26 commands cell balancing or recharging of the cells. The BCM 26 can also dictate and control the SOC of the battery pack 18 such that the battery back 18 as a whole similarly defines a minimum SOC.

Deep discharging of one or more of the cells 20 could be beneficial in certain circumstances. After the vehicle 10 has become permanently disabled, for example, a certain level of charge could remain in the cells 20 of the battery system 12. This remaining charge could cause issues. Hence, technology discussed herein enables the deep discharging of one or more of the cells 20.

The BCM 26 can control the switches 24. Once the BCM 26 detects a predetermined fault condition (trigger condition), the BCM 26 causes the switches 24 to close such that at least some of the cells 20 discharge the energy stored therein by way of the switches 22. Upon detection of the trigger condition, the BCM 26 can command one or all of the cells 20 to discharge such that the cells 20 achieve a SOC less than the minimum SOC. The BCM 26, in one example, can command all of the battery cells 20 to discharge. In another example, the BCM 26 can command a selected group of the battery cells 20 to discharge. In yet another example, the BCM 26 can command a selected group of the battery cells 20 to discharge, while activating or keeping active another selected group of battery cells that are not subject to any trigger condition. The resistors 22, in some implementations, are those used for normal battery system or cell balancing operations. Other implementations can include a dedicated set of resistors configured specifically for deep discharging events. Additional arrangements are also contemplated.

The trigger condition that initiates discharging of the battery 12 can be automatically generated. For example, the VSC 28 can send a notification signal to the BCM 26 in response to a detection of the vehicle 10 being involved in a crash. This notification can be the same notification that deploys the airbags and cuts off fuel to the engine. In such a situation, the BCM 26 commands the switches 24 to close to discharge the cells 20. Another trigger condition could arise if the BCM 26 detects one or more of the cells 20 to be charging/discharging in an anomalous manner. In response to this trigger condition, the BCM 26 commands those particular cells 20 to discharge. That is, the BCM 26 commands the switches 24 associated with those particular cells 20 to close. Yet another trigger could arise if the BCM 26 detects a significant overcharge above a threshold (e.g., a charge above 100% SOC). The BCM 26 can then command the cells 20 to discharge. Other automatic trigger conditions are contemplated in which the BCM 26 determines it necessary to discharge one or more of the cells 20. The trigger condition that initiates discharging of the battery 12 can also be manually generated as will be discussed further with reference to FIG. 3.

Figure 2:
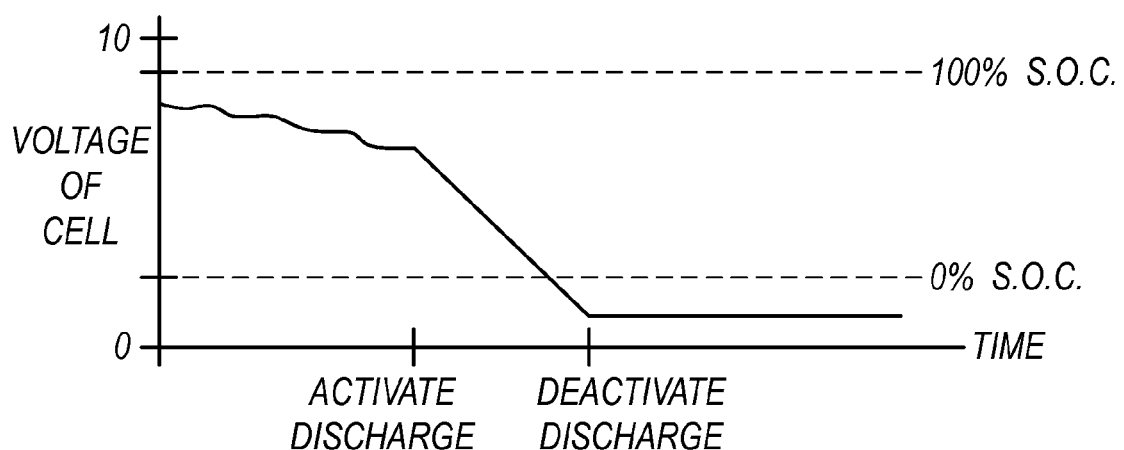
FIG. 2 is a graphical representation of a discharge of the traction battery of FIG. 1.

Referring to FIGS. 1 and 2, a graph of cell voltage over time is illustrated. As indicated, it should be understood that when a cell 20 is fully charged (i.e., 100% SOC), the maximum voltage of the cell 20 is not necessarily achieved. Rather, 100% SOC can be associated with a recommended upper voltage limit. For instance, if the maximum cell voltage is 10 volts, 100% SOC can be defined as approximately 8 volts. Hence, the controllers of the vehicle 10 will typically inhibit any charging above 100% SOC to avoid adversely affecting cell life/operation. The overall SOC of the battery pack 18 can be defined as approximately 70 volts or less, and this voltage limit can be more or less depending on the number of battery cells 20 in the battery pack 18. Similarly, 0% SOC can be associated with a recommended lower voltage limit, or minimum SOC as previously discussed. For instance, if the minimum cell voltage is 0 volts, 0% SOC can be defined as approximately 2 volts. Hence, the controllers of the vehicle 10 will typically inhibit any discharging below 0% SOC to avoid adversely affecting cell life/operation.

The voltage of selected cells 20 (or all of the cells 20) initially operates according to normal charge and discharge commands as dictated by the BCM 26. Once a triggering condition is detected by the VSC 28, the BCM 26 commands a discharge of the selected cells 20 (or all of the cells 20) to disable the selected cells 20 or render the battery pack 18 inoperable, according to methods described herein. The cells 20 dissipate their energy as heat through their associated resistors 22. Once the voltage in the cells 22 has reached a predetermined threshold, the BCM 26 commands the discharging to stop and future charging of the cells 20 can be disabled. In the example of FIG. 2, the discharging of the cells 20 stops once the SOC of the cells 20 falls below 0% SOC. This ensures that minimal voltage remains in the deep discharged cells 20. In another embodiment, the BCM 26 commands one or more switches 24 to close without further intervention from the BCM 26. After deep discharging and without intervention from the BCM 26, the amount of voltage remaining in the cell may no longer be large enough to keep the switch closed, and the switch can thus open without being commanded by the BCM 26 to open. In yet another embodiment, the discharging of the cells 20 stops once the SOC of the cells 20 falls below approximately 10% SOC. In yet another embodiment, the discharging of the cells 20 stops once the SOC of the cells 20 falls below approximately 20% SOC. Other thresholds are contemplated and may vary depending on how low the SOC must be in order to reduce or eliminate the risk of harm upon the occurrence of the triggering condition.

In one example during normal operation, five selected cells in the battery pack 18 are depleted to 30% SOC, 32% SOC, 34% SOC, 35% SOC, and 37% SOC. The BCM 26 detects a low SOC in the cells and correspondingly commands the cells to be recharged. The "minimum SOC" that triggers the BCM 26 to command a recharge of the cells can be, for example, 25% SOC. However, upon detection of the trigger condition, the selected cells are depleted to approximately 5% SOC and well below the minimum SOC. In another example during cell balancing, five selected cells are initially at 4.2V, 4.4V, 4.7V, 4.8V, and 5.0V. During cell balancing, the BCM 26 determines the cell with the lowest voltage (4.2V), discharges each of the remaining selected cells to approximately 4.2V, and recharges each of the cells 20 to "balance" the five cells 20. The "minimum voltage" that triggers cell balancing at any given time can be, for example, 4.0V such that the cells 20 are not discharged below 4.0V during normal operation or cell balancing. However, upon detection of the trigger condition, the selected cells 20 are discharged to approximately 1.7V and well below the "minimum voltage."

Figure 3:
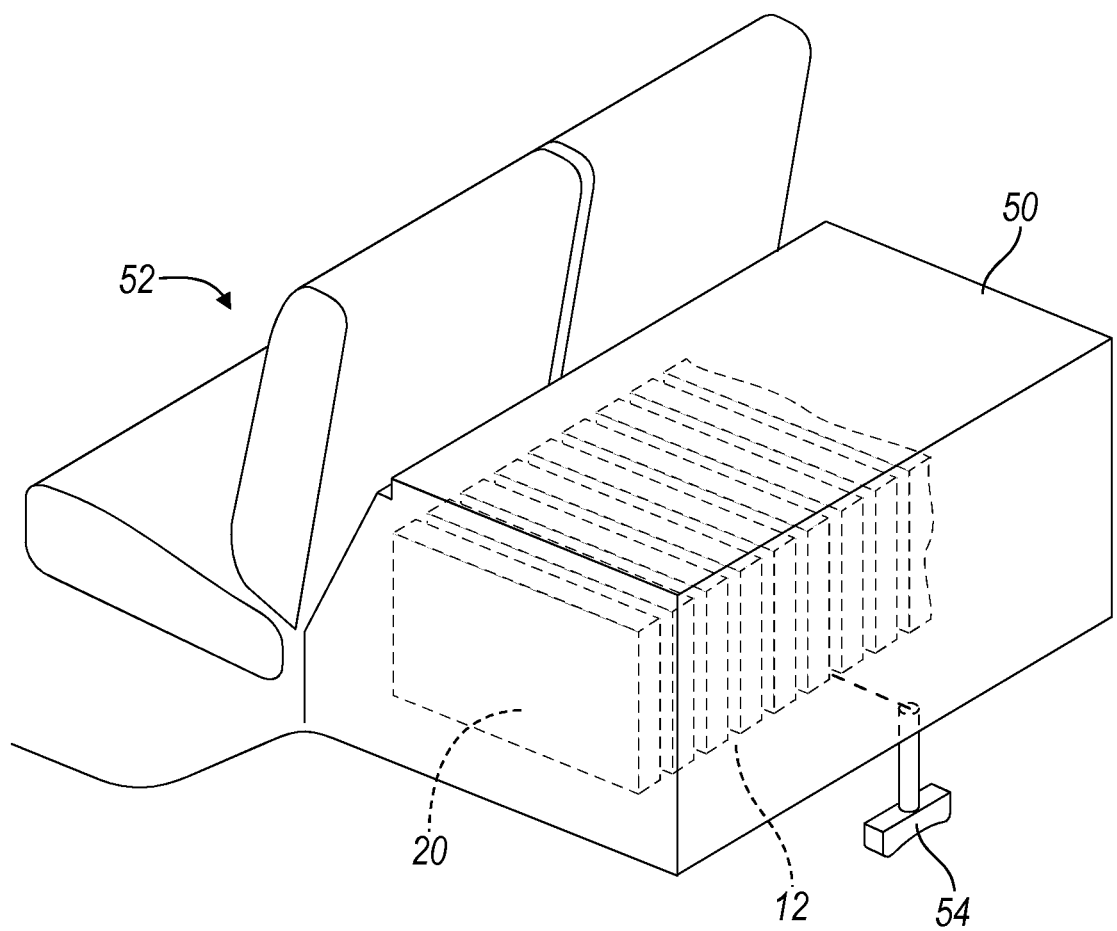
FIG. 3 is a perspective view of a manual traction battery discharge mechanism.

Referring to FIGS. 1 and 3, the battery 12 is enclosed within a battery housing 50. The housing 50 can be disposed rearward of a rear seat 52 within a storage compartment of the vehicle 10, for example. As previously described, it could be possible to manually initiate a trigger condition to cause the battery pack 18 to discharge. A manual discharge device, such as a pull-pin 54, can be connected to the BCM 26 or directly to the battery 12 and extend below the bottom exterior of the vehicle 10. When the pull-pin 54 is engaged and pulled by a user, a signal is sent to the BCM 26 such that the BCM 26 activates the discharge of the battery pack 18. The pull-pin 54 can alternatively be directly connected to one or more battery cells 20, such that pulling of the pull-pin 54 closes the switches 24 and the cells 20 are discharged.

It should be understood that the pull-pin 54 is merely an example of a manual discharge device. In other examples, the manual discharge device can be a button, tab, plug, or the like. The manual discharge device can also be selectable option on a display device in the vehicle 10, in which the user can select an option to discharge the battery pack 18. It is also contemplated that the manual discharge device can be connected to one or more individual battery cells 20, such that the user can activate the discharge of selected cells 20.

Figure 4:
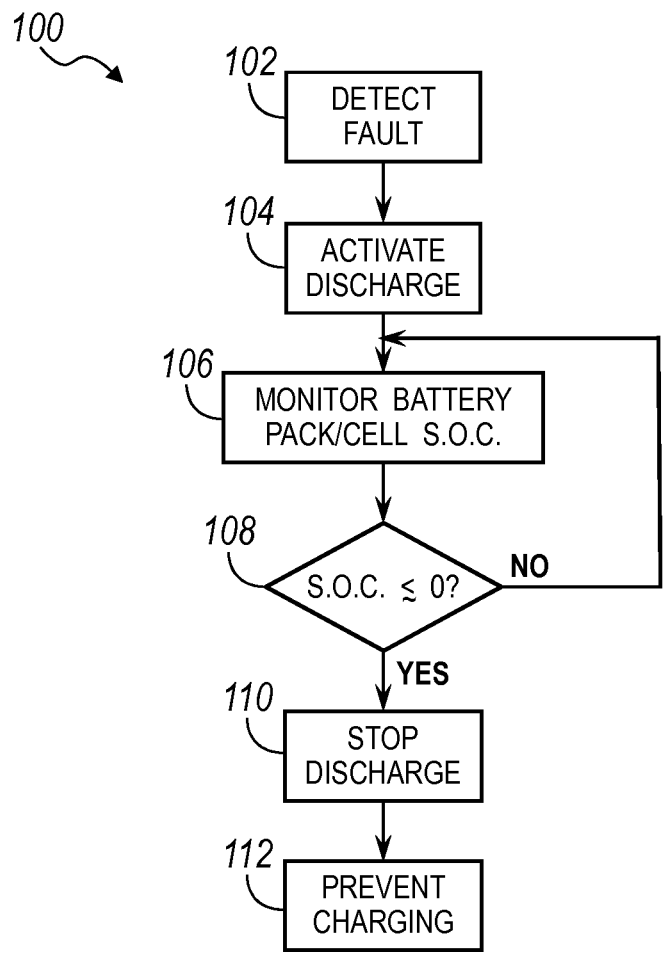
FIG. 4 is a flow chart of an algorithm for deep discharging battery cells.

Referring to FIGS. 1 and 4, an algorithm 100 for controlling deep discharge of battery cells is illustrated. The algorithm 100 can be implemented by the VSC 28, for example. At operation 102, the VSC 28 detects a fault condition, such as those described herein. At operation 104, the VSC 28 activates the discharge of the battery 12, the battery pack 18, or one or more selected individual battery cells 20. This is accomplished by closing the switches 24, for example. At operation 106, the VSC 28 continues to monitor the SOC of the battery 12/cells 20 throughout the discharging.

At operation 108, the BCM 26 determines if the SOC of the battery pack 18 or selected cells 20 is approximately zero or less. If the SOC of the battery pack 18 or selected cells 20 is not below this threshold, the BCM 26 continues to monitor the SOC of the battery 12/cells 20. If the SOC of the battery pack 18 or selected cells 20 is below this threshold, then at operation 110 the BCM 26 commands the discharging to halt. At operation 112, the BCM 26 can prevent further charging of the battery pack 18 or selected cells 20 such that the state of charge remains approximately less than or equal to zero. The BCM 26, for example, could disable any charge commands from being issued, etc. It should be understood that operation 112 and the preventing of discharging can be implemented during any/all steps along the algorithm 100 after the fault detection in operation 104.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a battery pack including a plurality of cells;
   an electric machine configured to transform electrical power from the battery pack to motive power for the vehicle; and
   at least one controller configured to cause a discharge of the cells in direct response to detecting a fault condition such that the battery pack achieves a state of charge of approximately zero or less to render the battery pack inoperable.

2. The vehicle of claim 1, wherein the at least one controller is further configured to inhibit charging of the cells such that the battery pack remains at the state of charge of approximately zero or less.

3. The vehicle of claim 1, wherein the state of charge of approximately zero or less is defined by a battery pack voltage of between 0 and 60 volts.

4. The vehicle of claim 1, wherein the at least one controller is further configured to generate the fault condition in response to user input requesting discharge of the battery pack.

5. The vehicle of claim 1, wherein the battery pack further includes a plurality of resistors and switches, each of the resistors electrically connectable to one of the cells via one of the switches, and wherein causing the discharge of the cells in response to detecting a fault condition includes closing the plurality of switches.

6. The vehicle of claim 1, wherein the discharge caused by the controller is a continuous discharge until the battery pack achieves the state of charge of approximately zero or less.

7. A vehicle comprising:
   a battery pack including a plurality of cells each achieving a minimum state of charge while discharging to support vehicle operation or during cell balancing;
   an electric machine configured to transform electrical power from the battery pack to motive power for the vehicle; and
   at least one controller configured to cause a discharge of selected cells of the battery pack in response to detecting a fault condition such that the selected cells achieve a state of charge less than the minimum states of charge.

8. The vehicle of claim 7, wherein the at least one controller is further configured to inhibit charging of the selected cells such that the state of charge of the selected cells remains less than the minimum states of charge.

9. The vehicle of claim 7, wherein the battery pack further includes a plurality of resistors and switches, each of the resistors electrically connectable to one of the cells via one of the switches, and wherein causing the discharge of selected cells in response to detecting a fault condition includes closing the switches associated with the selected cells.

10. The vehicle of claim 7, wherein the at least one controller is further configured to generate a fault condition in response to detecting a state of charge greater than a predetermined threshold.

11. The vehicle of claim 7, wherein the discharge caused by the controller is a continuous discharge until the selected cells achieve a state of charge less than the minimum states of charge.

12. A vehicle comprising:
    a battery pack including a plurality of cells and achieving a minimum state of charge while discharging to support vehicle operation or during cell balancing;
    an electric machine configured to transform electrical power from the battery pack to motive power for the vehicle; and
    at least one controller configured to cause a discharge of the cells in response to detecting a fault condition such that the battery pack achieves a state of charge less than the minimum state of charge.

13. The vehicle of claim 12, wherein the at least one controller is further configured to inhibit charging of the cells such that the battery pack remains at the state of charge less than the minimum state of charge.

14. The vehicle of claim 12, wherein the state of charge less than the minimum state of charge is defined by a state of charge of approximately zero or less.

15. The vehicle of claim 12, wherein the state of charge less than the minimum state of charge is defined by a battery pack voltage of between 0 and 60 volts.

16. The vehicle of claim 12, wherein the at least one controller is further configured to generate the fault condition in response to user input requesting discharge of the battery pack.

17. The vehicle of claim 12, wherein the battery pack further includes a plurality of resistors and switches, each of the resistors electrically connectable to one of the cells via one of the switches, wherein causing the discharge of the cells in response to detecting a fault condition includes closing the plurality of switches.

18. The vehicle of claim 12, wherein the at least one controller is configured to cause the discharge in direct response to detecting the fault condition.

19. The vehicle of claim 12, wherein the discharge caused by the controller is a continuous discharge until battery pack achieves a state of charge less than the minimum state of charge.

* * * * *